(12) United States Patent
Green et al.

(10) Patent No.: US 9,057,832 B2
(45) Date of Patent: Jun. 16, 2015

(54) DOUBLE LAYER INTERLEAVED P-N DIODE MODULATOR

(71) Applicant: International Business Machines Corporation, Armonk, NY (US)

(72) Inventors: William M. Green, Astoria, NY (US); Jessie C. Rosenberg, White Plains, NY (US); Yurii Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/492,410

(22) Filed: Sep. 22, 2014

(65) Prior Publication Data

US 2015/0011040 A1    Jan. 8, 2015

Related U.S. Application Data

(62) Division of application No. 13/529,360, filed on Jun. 21, 2012, now Pat. No. 8,889,447.

(51) Int. Cl.
| | |
|---|---|
| *H01L 21/00* | (2006.01) |
| *G02B 6/134* | (2006.01) |
| *G02B 6/12* | (2006.01) |
| *G02F 1/025* | (2006.01) |

(52) U.S. Cl.
CPC ............... *G02B 6/1347* (2013.01); *G02B 6/12* (2013.01); *G02B 2006/12061* (2013.01); *G02F 1/025* (2013.01); *G02F 2201/063* (2013.01); *G02F 2201/15* (2013.01); *G02F 2202/06* (2013.01); *G02F 2202/105* (2013.01)

(58) Field of Classification Search
CPC .................... G02B 6/1347; G02B 6/12; G02B 2006/12061; G02F 1/025; G02F 2202/105; G02F 2202/06; G02F 2201/063; G02F 2201/15

See application file for complete search history.

(56) References Cited

U.S. PATENT DOCUMENTS

| | | | |
|---|---|---|---|
| 6,912,079 B2 | 6/2005 | Liu | |
| 6,931,041 B2 * | 8/2005 | Booij et al. | ...................... 372/39 |
| 7,136,544 B1 | 11/2006 | Gunn, III et al. | |
| 7,711,212 B2 | 5/2010 | Green et al. | |
| 7,880,201 B2 * | 2/2011 | Vlasov et al. | .................. 257/212 |
| 8,378,465 B2 * | 2/2013 | Vlasov et al. | .................. 257/647 |

(Continued)

OTHER PUBLICATIONS

E. Huante-Ceron, "Optical Modulation by Controlling the Charge State of Deep Impurity Levels," 2011 Open Access Dissertations and Theses, Paper 6108, 200 pages.

(Continued)

*Primary Examiner* — Laura Menz
(74) *Attorney, Agent, or Firm* — Cantor Colburn LLP; Vazken Alexanian (57) ABSTRACT

A method for fabricating an optical modulator includes forming n-type layer, a first oxide portion on a portion of the n-type layer, and a second oxide portion on a second portion of the n-type layer, patterning a first masking layer over the first oxide portion, portions of a planar surface of the n-type layer, and portions of the second oxide portion, implanting p-type dopants in the n-type layer to form a first p-type region and a second p-type region, removing the first masking layer, patterning a second masking layer over the first oxide portion, a portion of the first p-type region, and a portion of the n-type layer, and implanting p-type dopants in exposed portions of the n-type layer, exposed portions of the first p-type region, and regions of the n-type layer and the second p-type region disposed between the substrate and the second oxide portion.

11 Claims, 11 Drawing Sheets

(56) References Cited

U.S. PATENT DOCUMENTS

| | | | | |
|---|---|---|---|---|
| 8,526,090 | B1* | 9/2013 | Green et al. | 359/237 |
| 8,889,447 | B2* | 11/2014 | Green et al. | 438/42 |
| 2004/0057646 | A1* | 3/2004 | Berry et al. | 385/12 |
| 2009/0080826 | A1* | 3/2009 | Green et al. | 385/3 |
| 2009/0263078 | A1* | 10/2009 | Hosomi et al. | 385/14 |
| 2010/0060970 | A1* | 3/2010 | Chen | 359/245 |
| 2010/0080504 | A1 | 4/2010 | Shetrit et al. | |
| 2011/0180795 | A1* | 7/2011 | Lo et al. | 257/51 |
| 2012/0057815 | A1* | 3/2012 | Ezaki et al. | 385/3 |
| 2013/0344634 | A1* | 12/2013 | Green et al. | 438/42 |

OTHER PUBLICATIONS

M. R. Watts et al, "Low-Voltage, Compact, Depletion-Mode, Silicon Mach-Zehnder Modulator," IEEE Journal of Selected Topics in Quantum Electronics, vol. 16, No. 1, Jan./Feb. 2010, pp. 159-164.

M. Ziebell et al, "Ten Gbit/s ring resonator silicon modulator based on interdigitated PN junctions," Optics Express, vol. 19, No. 15, Jul. 18, 2011, pp. 1-6.

N. N. Feng et al., "High speed carrier-depletion modulators with 1.4V-cm V L integrated on 0.25 um silicon-on-insulator waveguides," Optics Express, vol. 18, No. 8, Apr. 12, 2010, pp. 1-6.

PCT International Search Report and Written Opinion; International Application No. PCT/US2013/036696; International Filing Date: Apr. 16, 2013; Date of Mailing: Aug. 22, 2013; pp. 1-17.

X. Xiao, et al., "25 Gbit/s Silicon Microring Modulator Based on Misalignment-tolerant Interleaved PN Junctions," Opt. Express 2507, vol. 20, No. 3, pp. 2507-2515 (Jan. 30, 2012).

Zhi-Yong Li et al., "Silicon waveguide modulator based on carrier depletion in periodically interleaved PN Junctions," Optics Express, vol. 17, No. 18, Aug. 31, 2009, pp. 1-12.

* cited by examiner

DOUBLE LAYER INTERLEAVED P-N DIODE MODULATOR

DOMESTIC PRIORITY

This application is a divisional of U.S. patent application Ser. No. 13/529,360, filed Jun. 21, 2012, the disclosure of which is incorporated by reference herein in its entirety.

FIELD OF INVENTION

The present invention relates generally to electro-optic modulators, and more specifically, to a double layer interleaved p-n diode modulator.

DESCRIPTION OF RELATED ART

Figure 1A:
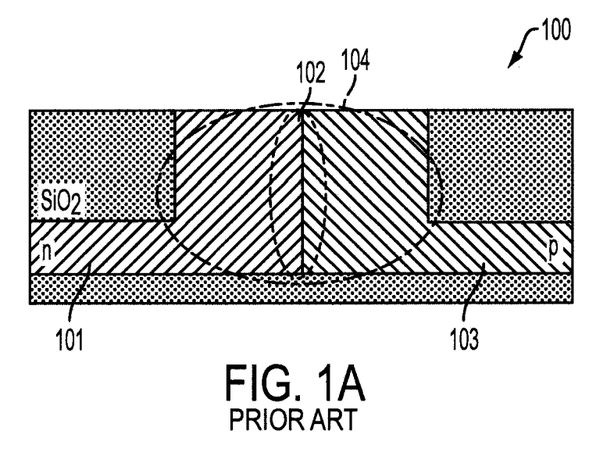
FIG. 1A illustrates a cross-sectional view of a prior art example of a reverse-biased silicon electro-optic modulator.
Figure 1B:
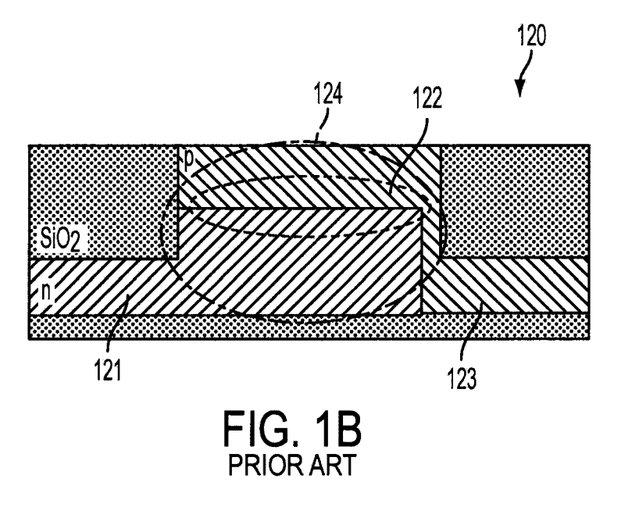
FIG. 1B illustrates a cross-sectional view of another prior art example of a reverse-biased silicon electro-optic modulator.

The efficiency of p-n junctions for reverse-biased silicon electro-optic modulators is partially affected by the overlap of the p-n junction with the guided optical mode. In this regard, FIG. 1A illustrates a cross-sectional view of a prior art example of a reverse-biased silicon electro-optic modulator 100. The junction area 102 is shown between the n-region 101 and the p-region 103. The junction area 102 interacts with the optical mode 104. FIG. 1B illustrates a cross-sectional view of another prior art example of a reverse-biased silicon electro-optic modulator 120 that includes an n-region 121, a p-region 123, and a junction area 122 that interacts with the optical mode 124.

BRIEF SUMMARY

According to one embodiment of the present invention, a method for fabricating an optical modulator device includes forming n-type doped material layer on a substrate, a first oxide portion on a portion of the n-type doped material layer, and a second oxide portion on a second portion of the n-type doped material layer, patterning a first masking layer over the first oxide portion, portions of a planar surface of the n-type doped material layer, and portions of the second oxide portion, implanting p-type dopants in the n-type doped material layer to form a first p-type doped region and a second p-type doped region, wherein the first p-type region extends from the planar surface of the n-type doped material layer to a first depth in the n-type doped material layer, the second p-type doped region extends from a second depth in the n-type doped material layer to the substrate, removing the first masking layer, patterning a second masking layer over the first oxide portion, a portion of the first p-type doped region, and a portion of the n-type doped material layer, and implanting p-type dopants in exposed portions of the n-type doped material layer, exposed portions of the first p-type doped region, and regions of the n-type doped material layer and the second p-type doped region disposed between the substrate and the second oxide portion.

According to another embodiment of the present invention, a method for fabricating an optical modulator device includes forming n-type doped material layer on a substrate, a first oxide portion on a portion of the n-type doped material layer, and a second oxide portion on a second portion of the n-type doped material layer, patterning a first masking layer over the first oxide portion, portions of a planar surface of the n-type doped material layer, and portions of the second oxide portion, implanting p-type dopants in the n-type doped material layer to form a first p-type doped region and a second p-type doped region, wherein the first masking layer is operative to impinge the p-type dopants that pass through the first masking layer such that the first p-type region extends from the planar surface of the n-type doped material layer to a first depth in the n-type doped material layer, the second p-type doped region extending from a second depth in the n-type doped material layer to the substrate, removing the first masking layer, patterning a second masking layer over the first oxide portion, a portion of the first p-type doped region, and a portion of the n-type doped material layer, implanting p-type dopants, wherein the second masking layer is operative to impede the p-type dopants such that the p-type dopants are implanted in exposed portions of the n-type doped material layer, exposed portions of the first p-type doped region, and regions of the n-type doped material layer and the second p-type doped region disposed between the substrate and the second oxide portion.

According to yet another embodiment of the present invention, a method for fabricating an optical modulator device includes forming p-type doped material layer on a substrate, a first oxide portion on a portion of the p-type doped material layer, and a second oxide portion on a second portion of the p-type doped material layer, patterning a first masking layer over the first oxide portion, portions of a planar surface of the p-type doped material layer, and portions of the second oxide portion, implanting n-type dopants in the p-type doped material layer to form a first n-type doped region and a second n-type doped region, wherein the first n-type region extends from the planar surface of the p-type doped material layer to a first depth in the p-type doped material layer, the second n-type doped region extends from a second depth in the p-type doped material layer to the substrate, removing the first masking layer, patterning a second masking layer over the first oxide portion, a portion of the first n-type doped region, and a portion of the p-type doped material layer, and implanting n-type dopants in exposed portions of the p-type doped material layer, exposed portions of the first n-type doped region, and regions of the p-type doped material layer and the second n-type doped region disposed between the substrate and the second oxide portion.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 2A-5D illustrate an exemplary method for fabricating a p-n diode feature on a substrate. In this regard:

DETAILED DESCRIPTION

Previous reverse-biased silicon electro-optic modulators such as the prior art examples described above in FIGS. 1A and 1B, are limited in efficiency due to the relatively small junction areas between the n and p regions. The methods and resultant structures described below provide reverse-biased silicon electro-optic modulators that have increased areas of overlap between the optical field and the p-n junction region.

Figure 2A:
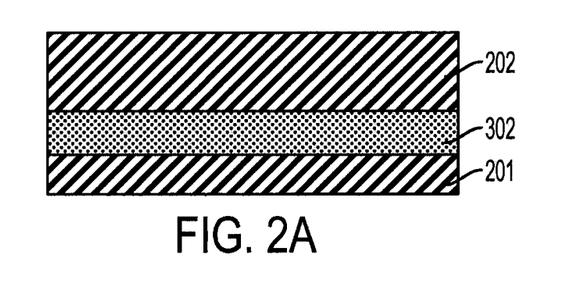
FIG. 2A illustrates a silicon layer disposed on a substrate.
Figure 2B:
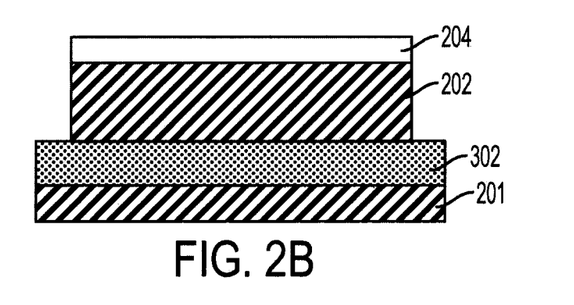
FIG. 2B, illustrates a photolithographic masking layer patterned on the silicon layer.
Figure 2C:
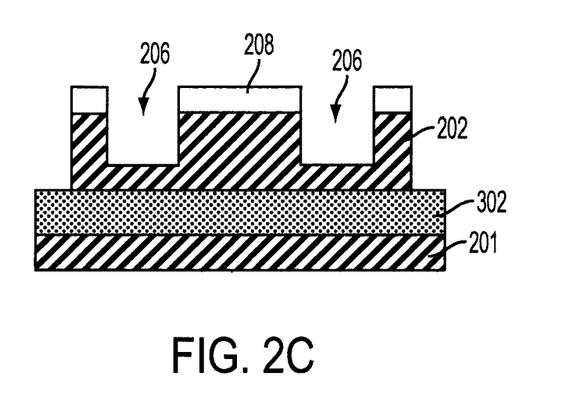
FIG. 2C illustrates the patterning of the masking layer.
Figure 2D:
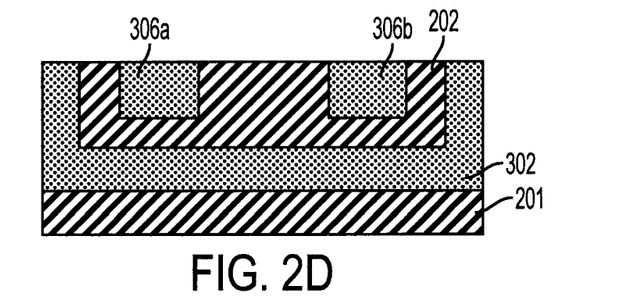
FIG. 2D illustrates an oxide material is formed in cavities.
Figure 2E:
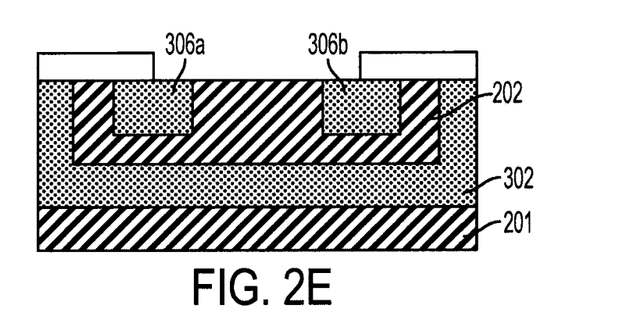
FIG. 2E illustrates a masking layer patterned over portions of the buried oxide (BOX), the oxide material, and the silicon layer.
Figure 2F:
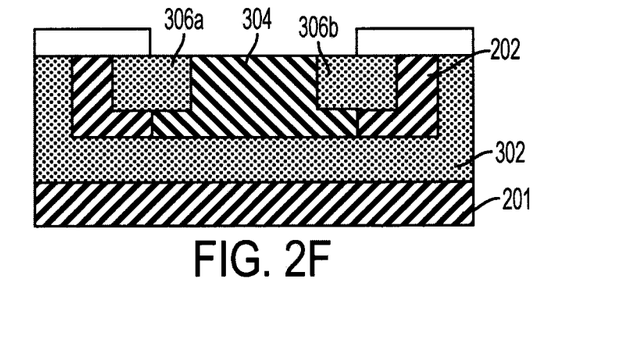
FIG. 2F illustrates the formation of an n-type doped region.

FIGS. 2A-5D illustrate an exemplary method for fabricating a p-n diode feature on a substrate. Referring to FIG. 2A, a silicon layer 202 is disposed on a substrate that includes a buried oxide layer (BOX) 302 that is disposed on a silicon layer 201. In FIG. 2B, a photolithographic masking layer 204 is patterned on the silicon layer 202 and an etching process such as, for example, reactive ion etching (RIE) is performed to remove exposed portions of the silicon layer 202 and expose portions of the BOX 302. In FIG. 2C, the masking layer 204 may be patterned, or removed, and another masking layer may be patterned on the silicon layer 202 to result in the masking layer 208. An etching process is performed to remove exposed portions of the silicon layer 202 and define cavities 206. In FIG. 2D, an oxide material is formed in the cavities 206 to result in oxide material 306a and 306b. In FIG. 2E, a masking layer 210 is patterned over portions of the BOX 302, the oxide material 306a and 306b, and the silicon layer 202. In FIG. 2F, an n-doped region 304 is formed by implanting n-type dopants in the exposed portions of the silicon layer 202.

Figure 3A:
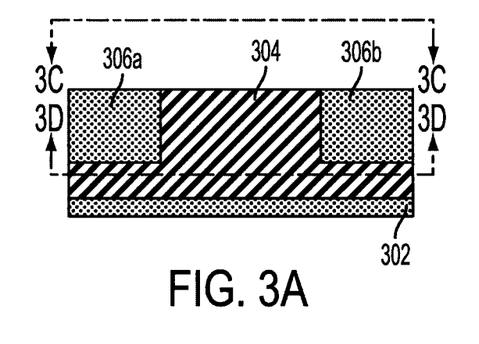
FIG. 3A illustrates a cross-sectional view along the line 3A of FIG. 3C of a n-type region on a substrate.
Figure 3B:
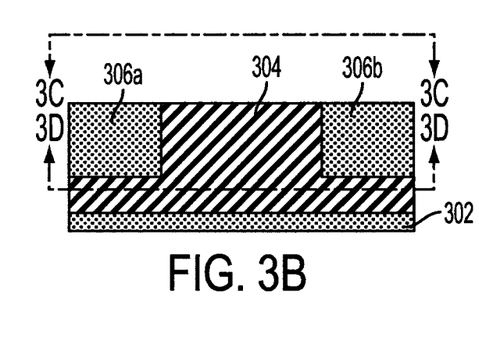
FIG. 3B illustrates a cross-sectional view along the line 3B of FIG. 3C.
Figure 3C:
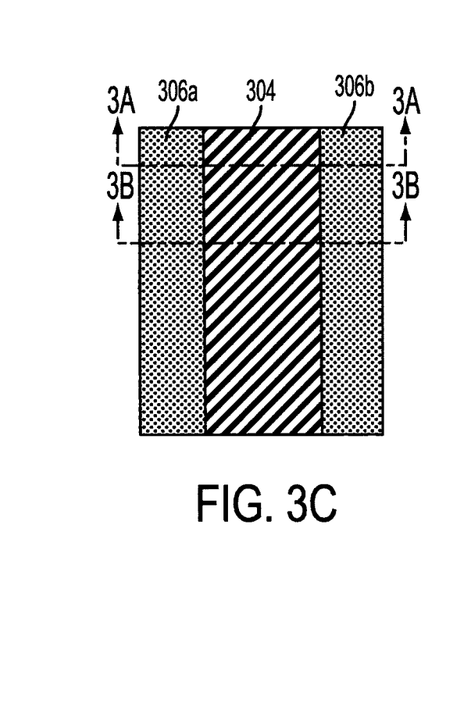
FIG. 3C illustrates a top view along the line 3C of FIGS. 3A and 3B.
Figure 3D:
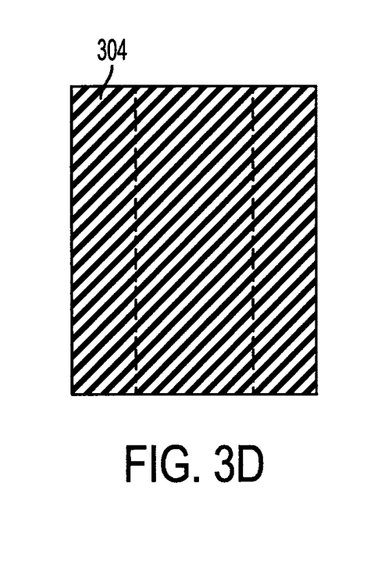
FIG. 3D illustrates a bottom view along the line 3D of FIGS. 3A and 3B.

Referring to FIG. 3, FIG. 3A illustrates a cross-sectional view along the line 3A (of FIG. 3C); FIG. 3B illustrates a cross-sectional view along the line 3B (of FIG. 3C); FIG. 3C illustrates a top view; and FIG. 3D illustrates a bottom view along the line 3D (of FIGS. 3A and 3B). FIG. 3A illustrates the formation of an n doped region 304 arranged on a substrate 302 that may include, for example an oxide material such as $SiO_2$ or a similar material. The n-doped region 304 may include, for example silicon that is doped with n-type dopants using, for example, an ion implantation process. An oxide material 306a and 306b that may include, for example, $SiO_2$, is formed over portions of the n-doped region 304.

Figure 4A:
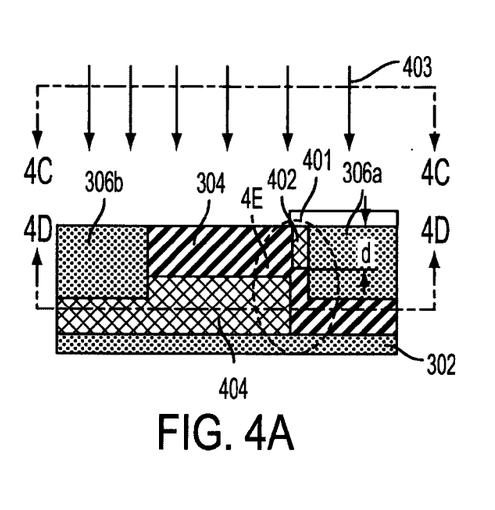
FIG. 4A illustrates a cross-sectional view along the line 4A of FIG. 4C of a masking layer and a p-type region.
Figure 4B:
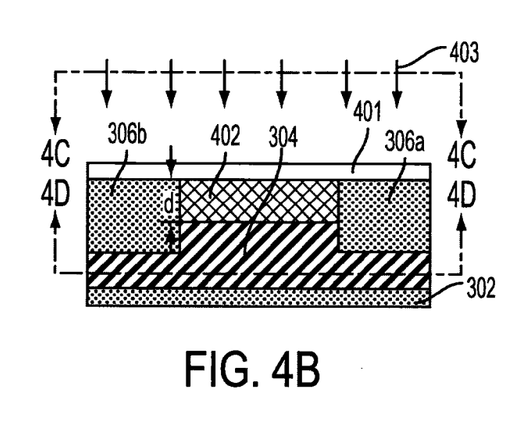
FIG. 4B illustrates a cross-sectional view along the line 4B of FIG. 4C.
Figure 4C:
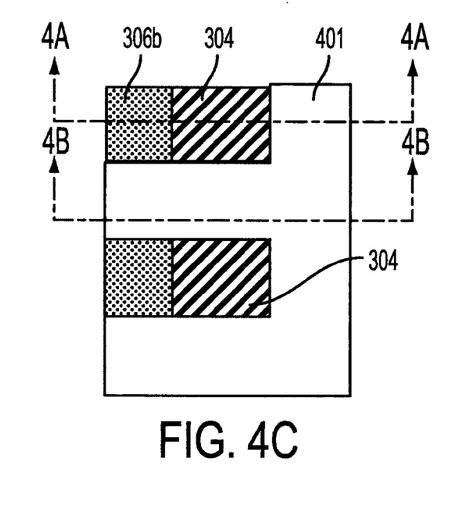
FIG. 4C illustrates a top view along the line 4C of FIGS. 4A and 4B.
Figure 4D:
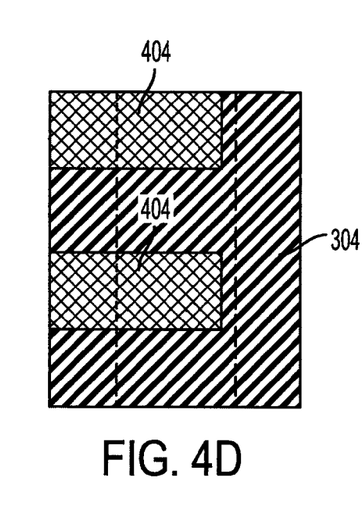
FIG. 4D illustrates a bottom view along the line 4D of FIGS. 4A and 4B.

Referring to FIG. 4, FIG. 4A illustrates a cross-sectional view along the line 4A (of FIG. 4C); FIG. 4B illustrates a cross-sectional view along the line 4B (of FIG. 4C); FIG. 4C illustrates a top view; and FIG. 4D illustrates a bottom view along the line 4D (of FIGS. 4A and 4B). FIG. 4C illustrates a masking layer 401 that has been patterned over portions of the n-doped region 304 and the oxide material 306a. The masking layer 401 may include any suitable masking material such as, for example, an oxide hardmask material or an organic masking material. The masking layer 401 may be formed using any suitable photolithographic patterning and/or etching process. The masking layer 401 is patterned such that the exposed oxide material 306a on one side of the n-type doped region 304 is obscured by the masking layer 401, as well as a portion of the adjacent n-type doped region 304. Portions of the n-type doped region 304 and the opposing oxide material 306b are also obscured by the masking layer 401. The masking layer 401 is formed at a desired thickness, which is operative to affect the depth of penetration of implanted p-type type dopants 403. In this regard, referring to FIG. 4B, a first p-type region 402 is formed in the n-type doped region 304. The first p-type region 402 extends in depth from the surface of the n-type doped region 304 (obscured by the masking layer 401) to a depth, d. FIG. 4A illustrates another portion of the first p-type region 402, and a second p-type region 404 that is formed below the depth d during the implantation process in portions of the n-type region 304 that are not obscured by the masking layer 401. The second p-type region 404 is formed below the depth, d, since the masking layer 401 is not present above the second p-type region 404 to reduce the penetration the of dopant implantation.

Though the embodiments described herein include the formation of p-type regions following the formation of the n-type region 304, alternate embodiments may include the formation of a p-type region similar to the n-type region 304 followed by the formation of an n-type regions in a similar manner as the p-type regions. Thus, the resultant structure of alternate embodiments may include n-type regions replaced by p-type regions, and p-type regions replaced by n-type regions.

Figure 4E:
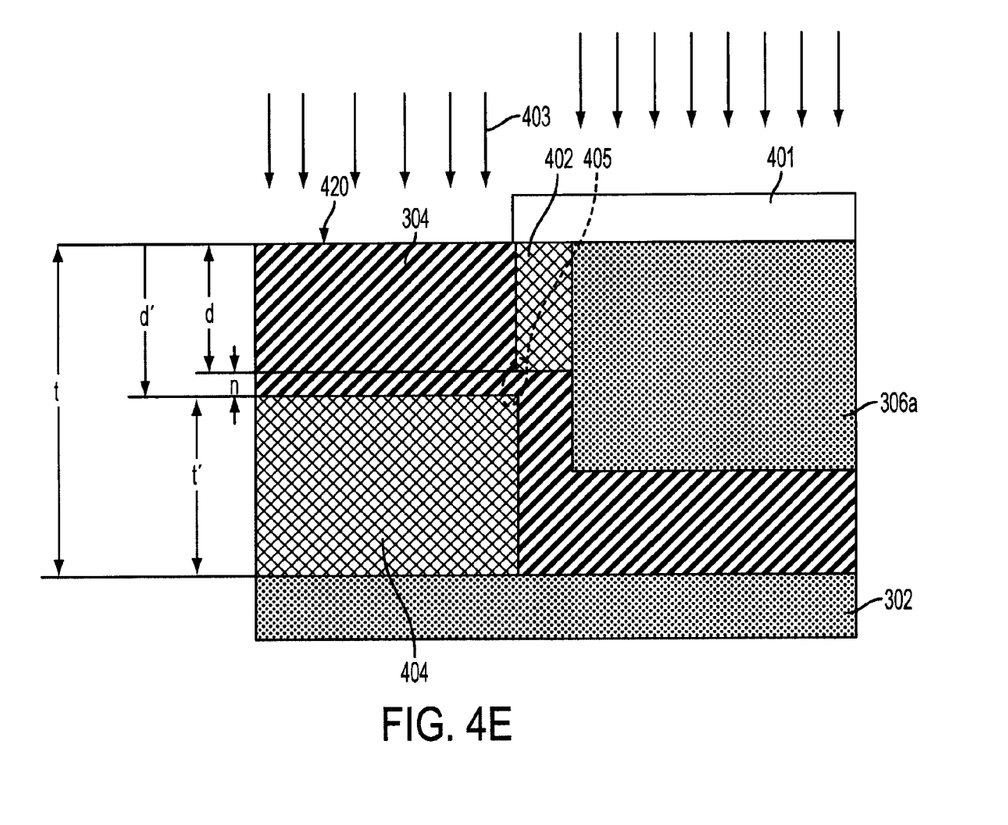
FIG. 4E illustrates a detailed view of the region 4E (of FIG. 4A)

FIG. 4E illustrates a detailed view of the region 4E (of FIG. 4A) in this regard, the first p-type region 402 and the second p-type region 404 define a gap 405 with a portion of the n-type doped region 304 disposed there between. The material used and the thickness of the masking layer 401 along with the parameters (e.g., type of dopants and power used) in the implantation process affects the depth d of the first p-type region 402 and the resultant gap 405. The gap 405 provides a connective region in the n-type doped region 304. The n-type doped region 304 has a thickness, t, defined by the surface 420 and the substrate 302. The first p-type region 402 extends from the surface 420 of the n-type doped region 304 the depth d. The second p-type doped region 404 begins at a depth, d', defined by the surface 420 and extends to the substrate 302 such that the second p-type doped region 404 has a thickness dimension (substantially normal to the substrate 302) of t',. The gap 405 has a dimension, n, (substantially normal to the substrate 302) where n=t−(d+t').

Figure 4F:
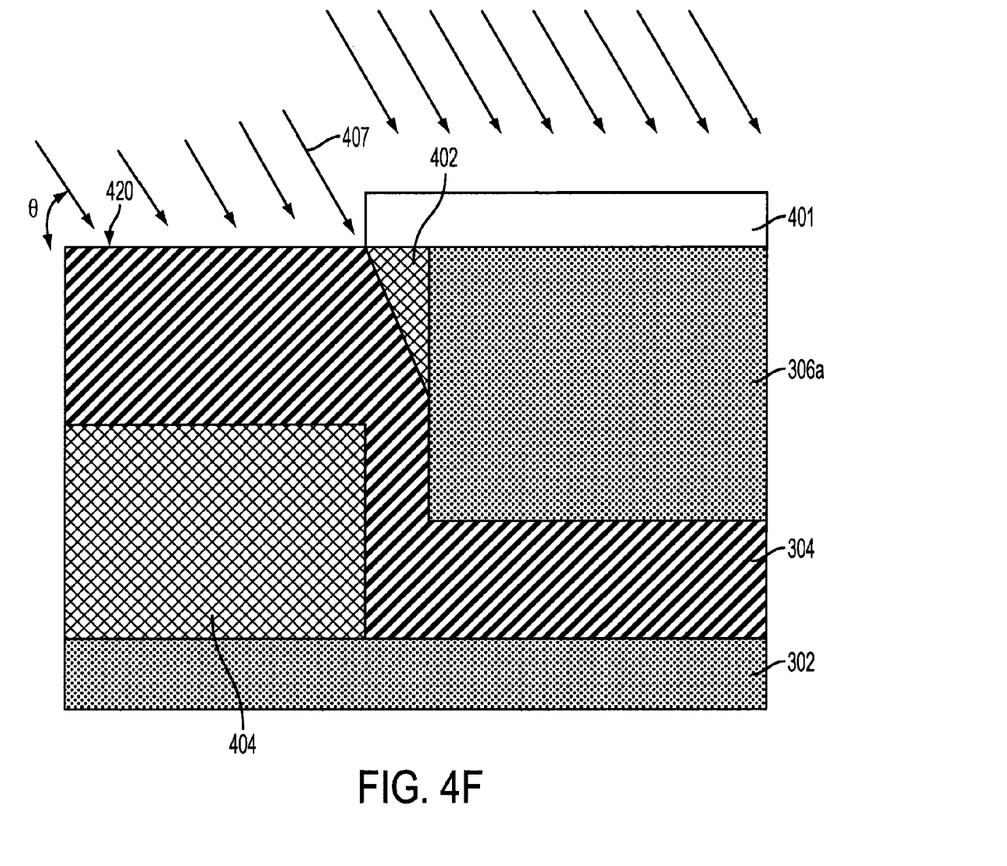
FIG. 4F illustrates a detailed view of an alternate embodiment of the region 4E (of FIG. 4A)

FIG. 4F illustrates a detailed view of an alternate embodiment of the region 4E (of FIG. 4A); where the first p-type region 402 is formed in the n-type doped region 304 is formed by p-type dopants 407 that are imbedded at an angle, θ, relative to the surface 420 resulting in a portion of the first p-type region 402 having a beveled profile corresponding to the angle θ.

In an alternative embodiment, the first p-type region 402 and the second p-type region 404 may be formed using an implant as shown in FIG. 4E. Following the implant, an angled implant similar to the implant shown in FIG. 4F may be performed using n-type dopants that are implanted using parameters such that the n-type dopants do not appreciably penetrate into the second p-type region 404. However, the angled n-type dopant implant counter-dopes a portion of the second p-type region 404 resulting in a structure similar to the structure illustrated in FIG. 4F, which may further define the gap 405 to a desired dimension.

Figure 5A:
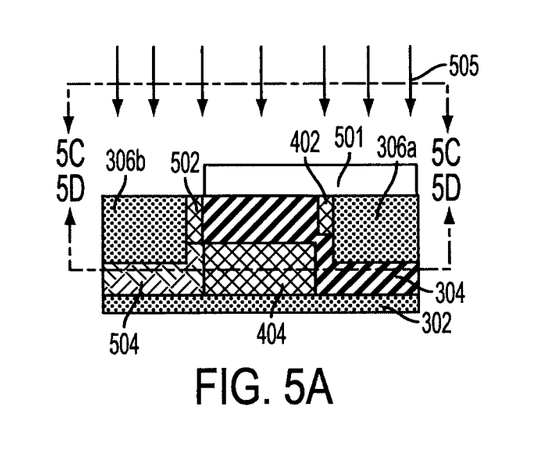
FIG. 5A illustrates a cross-sectional view along the line 5A of FIG. 5C of a second masking layer and the formation of p-type regions.
Figure 5B:
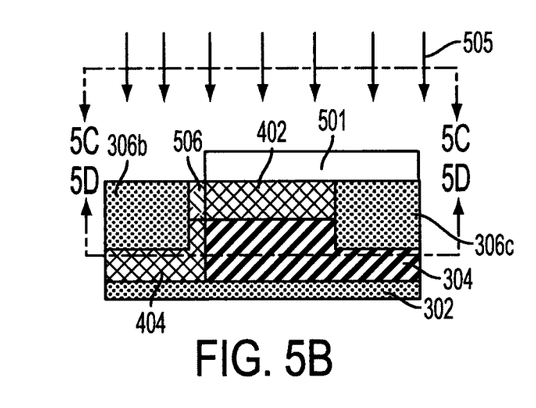
FIG. 5B illustrates a cross-sectional view along the line 5B of FIG. 5C.
Figure 5C:
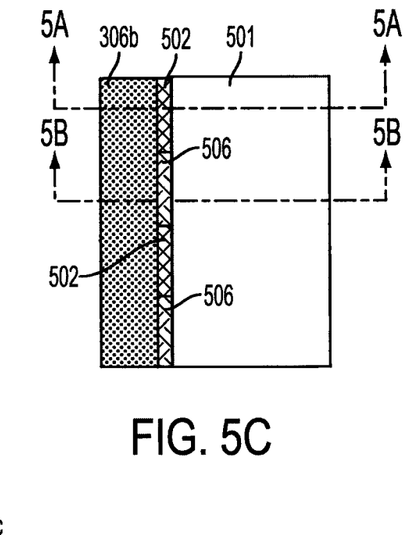
FIG. 5C illustrates a top view along the line 5C of FIGS. 5A and 5B.
Figure 5D:
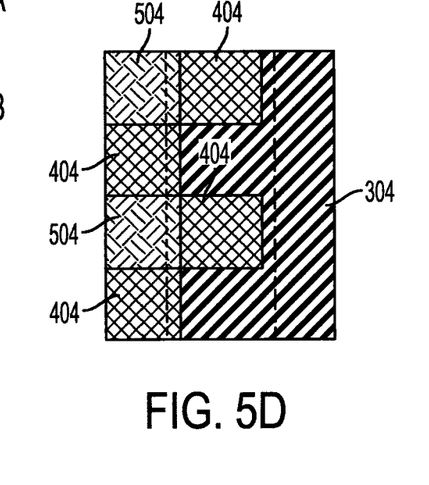
FIG. 5D illustrates a bottom view along the line 5D of FIGS. 5A and 5B.

Referring to FIG. 5, FIG. 5A illustrates a cross-sectional view along the line 5A (of FIG. 5C); FIG. 5B illustrates a cross-sectional view along the line 5B (of FIG. 5C); FIG. 5C illustrates a top view; and FIG. 5D illustrates a bottom view along the line 5D (of FIGS. 5A and 5B). FIG. 5A illustrates the patterning of a second mask layer 501 (following the removal of the mask layer 401) over portions of the oxide material 306a, the n-type doped region 304, and the first p-type region 402. The second mask layer 501 may be formed from, for example, a hardmask material or an organic material using a suitable lithographic patterning and/or etching process. The thickness of the second mask layer 501 (or the materials used in the second mask layer 501) is operative to prevent the implantation of p-type dopants 505 in regions obscured by the second mask layer 501. Portions of the n-type doped region 304 and the first p-type region 402 adjacent to the oxide material 306b remain unobscured by the second mask layer 501 such that p-type dopants 505 may be implanted in the unobscured regions. Thus, referring to FIG. 5A, a third p-type region 502 is formed in exposed portions of the n-type doped region 304 (resulting in the third p-type regions 502). The third p-type region 502 is connected to the second p-type region 404. A p$^+$-type doped region 504 is formed in portions of the second p-type region 404 that are exposed to the p-type dopants.

Referring to FIG. 5B, the unobscured portions of the first p-type region 402 adjacent to the oxide material 306b are exposed to the p-type dopants 505, which results in p$^+$-type doped regions 506 that connect the first p-type region 402 with portions of the second p-type region 404.

Figure 6:
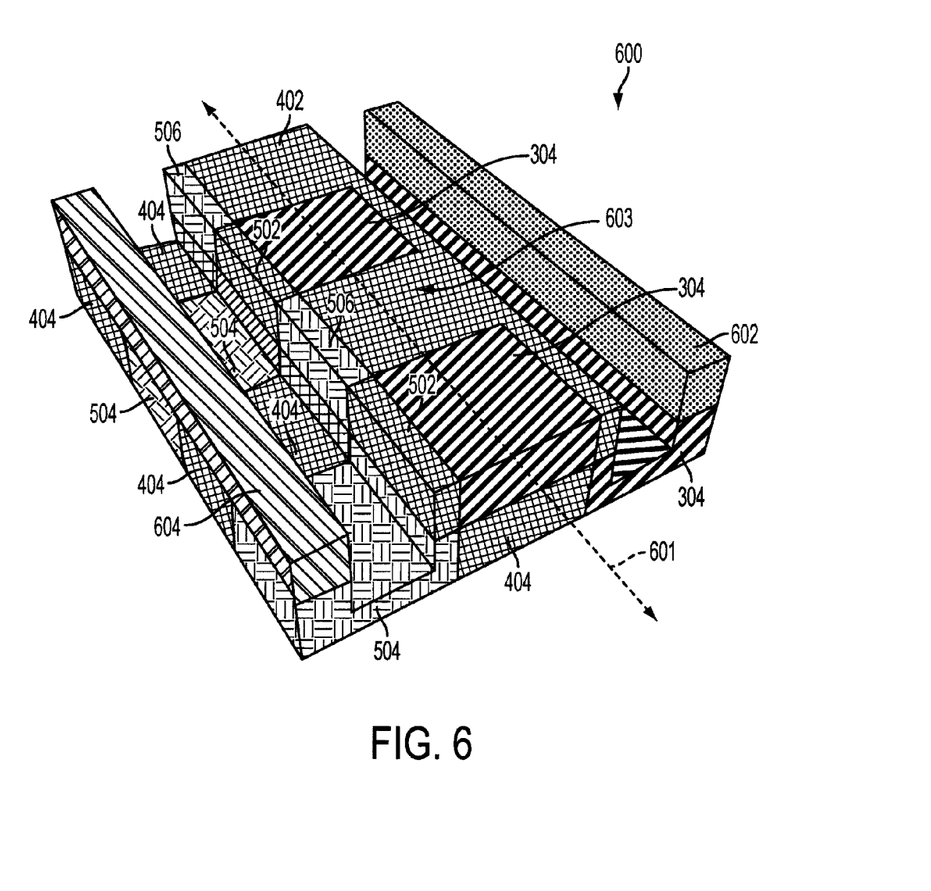
FIG. 6 illustrates a perspective view of an exemplary embodiment of a p-n diode modulator device.
Figure 7:
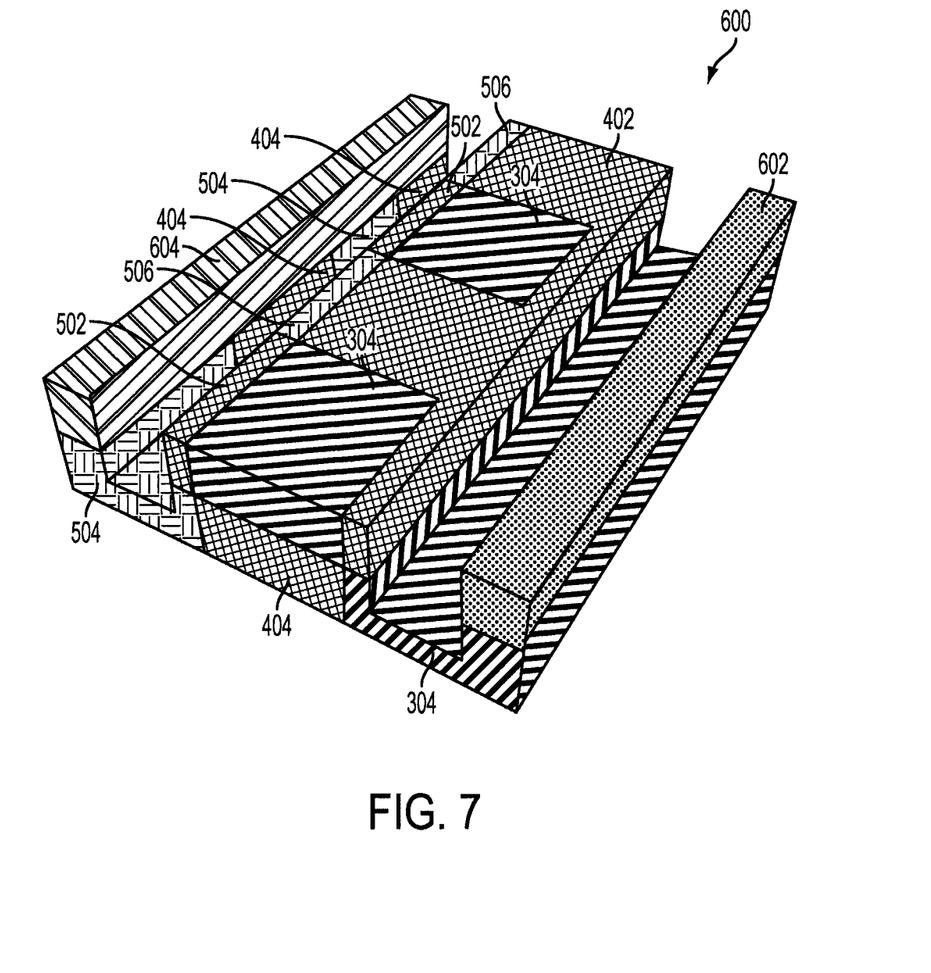
FIG. 7 illustrates another perspective view of an exemplary embodiment of a p-n diode modulator device.

FIG. 6 illustrates a perspective view of an exemplary embodiment of a p-n diode modulator device 600. The device 600 includes a body portion 603, and an n-type contact portion 602 that is connected to the n-type doped region 304. A p-type contact portion 604 is connected to the first p-type region 402, the second p-type region 404, the third p-type regions 502, the p$^+$-type doped regions 504, and the p$^+$-type regions 506. In operation, the optical mode propagates along the longitudinal axis of the device 600 indicated by the arrow 601. FIG. 7 illustrates another perspective view of an exemplary embodiment of the p-n diode modulator device 600.

The device 600 provides increased p-n junction regions to improve the efficiency of the p-n diode modulator device 600.

Though the embodiments described herein include the formation of p-type regions following the formation of the n-type region 304, alternate embodiments may include the formation of a p-type region similar to the n-type region 304 followed by the formation of an n-type regions in a similar manner as the p-type regions. Thus, the resultant structure of alternate embodiments may include a similar structure as the device 600.

Figure 8:
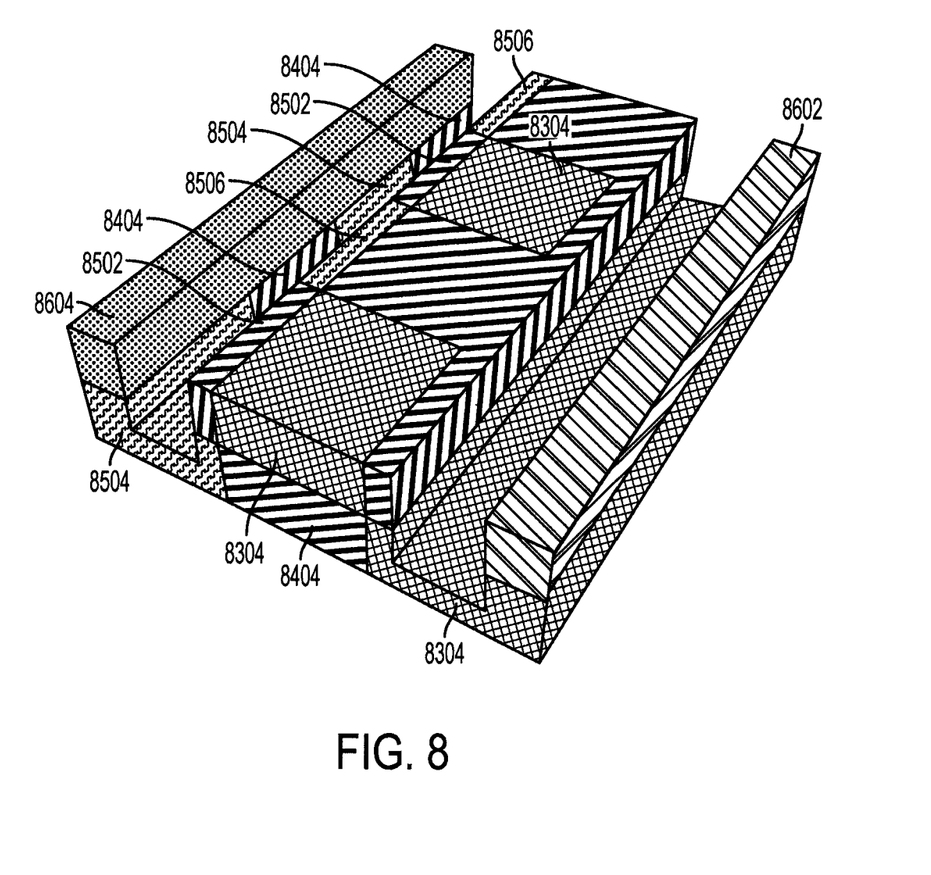
FIG. 8 illustrates perspective view of an alternate exemplary embodiment of a p-n diode modulator device.

In this regard, FIG. 8 illustrates an alternate exemplary embodiment of a p-n diode modulator device 800 having a similar structure as the device 600 (of FIGS. 6 and 7) described above, however the n-type regions and the p-type regions have been replaced by one another. For example, the device 800 includes p-type regions 8304 and 8602 and n-type regions 8404, 8502, 8504, 8506, and 8604. Such a structure may be fabricated using similar methods as described above by exchanging the p-type dopants with n-type dopants and the n-type dopants with p-type dopants.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for fabricating an optical modulator device, the method comprising:
forming n-type doped material layer on a substrate, a first oxide portion on a portion of the n-type doped material layer, and a second oxide portion on a second portion of the n-type doped material layer;

patterning a first masking layer over the first oxide portion, portions of a planar surface of the n-type doped material layer, and portions of the second oxide portion;

implanting p-type dopants in the n-type doped material layer to form a first p-type doped region and a second p-type doped region, wherein the first masking layer is operative to impinge the p-type dopants that pass through the first masking layer such that the first p-type region extends from the planar surface of the n-type doped material layer to a first depth in the n-type doped material layer, the second p-type doped region extending from a second depth in the n-type doped material layer to the substrate;

removing the first masking layer;

patterning a second masking layer over the first oxide portion, a portion of the first p-type doped region, and a portion of the n-type doped material layer; and implanting p-type dopants, wherein the second masking layer is operative to impede the p-type dopants such that the p-type dopants are implanted in exposed portions of the n-type doped material layer, exposed portions of the first p-type doped region, and regions of the n-type doped material layer and the second p-type doped region disposed between the substrate and the second oxide portion.

2. The method of claim 1, wherein the first p-type doped region and the second p-type doped region define a gap having a portion of the n-type doped material layer disposed therebetween.

3. The method of claim 1, wherein the second depth is greater than the first depth relative to the planar surface of the n-type doped material layer.

4. The method of claim 1, wherein the implanting p-type dopants in the n-type doped material layer to form a first p-type doped region and a second p-type doped region includes implanting the p-type dopants at an oblique angle relative to the planar surface of the n-type doped material layer.

5. The method of claim 1, wherein the first masking layer partially defines the first p-type doped region and the second p-type doped region.

6. The method of claim 1, further comprising, prior to forming the n-type doped material on the substrate:
patterning a third masking layer over a silicon layer;
removing portions of the silicon layer to expose portions of a buried oxide layer;
removing the third masking layer;
patterning a fourth masking layer over portions of the silicon layer;
removing portions of the silicon layer to define a first cavity and a second cavity in the silicon layer;
forming a first oxide portion in the first cavity, and a second oxide portion in the second cavity; and
implanting n-type dopants in portions of the silicon layer.

7. The method of claim 1, further comprising patterning a fifth masking layer over portions of the first oxide portion, the second oxide portion and the silicon layer prior to implanting the n-type dopants in the portions of the silicon layer.

8. A method for fabricating an optical modulator device, the method comprising:
forming p-type doped material layer on a substrate, a first oxide portion on a portion of the p-type doped material layer, and a second oxide portion on a second portion of the p-type doped material layer;

patterning a first masking layer over the first oxide portion, portions of a planar surface of the p-type doped material layer, and portions of the second oxide portion;

implanting n-type dopants in the p-type doped material layer to form a first n-type doped region and a second n-type doped region, wherein the first n-type region extends from the planar surface of the p-type doped material layer to a first depth in the p-type doped material layer, the second n-type doped region extends from a second depth in the p-type doped material layer to the substrate;

removing the first masking layer;

patterning a second masking layer over the first oxide portion, a portion of the first n-type doped region, and a portion of the p-type doped material layer; and implanting n-type dopants in exposed portions of the p-type doped material layer, exposed portions of the first n-type doped region, and regions of the p-type doped material layer and the second n-type doped region disposed between the substrate and the second oxide portion.

9. The method of claim 8, wherein the first n-type doped region and the second n-type doped region define a gap having a portion of the p-type doped material layer disposed therebetween.

10. The method of claim 8, wherein the second depth is greater than the first depth relative to the planar surface of the p-type doped material layer.

11. The method of claim 8, wherein the implanting n-type dopants in the p-type doped material layer to form a first n-type doped region and a second n-type doped region includes implanting the n-type dopants at an oblique angle relative to the planar surface of the p-type doped material layer.

* * * * *